(12) United States Patent
Babko-Malyi et al.

(10) Patent No.: US 6,365,112 B1
(45) Date of Patent: Apr. 2, 2002

(54) DISTRIBUTION OF CORONA DISCHARGE ACTIVATED REAGENT FLUID INJECTED INTO ELECTROSTATIC PRECIPITATORS

(76) Inventors: Sergei Babko-Malyi, 3231 Quincy St., Butte, MT (US) 59701; Isaac Ray, 3700 Bedford Ave., Brooklyn, NY (US) 11229; Wayne P. Buckley, 28 Unger Ave., RD1 Stanhope, NJ (US) 07874

( * ) Notice: Subject to any disclaimer, the term of this patent is extended or adjusted under 35 U.S.C. 154(b) by 0 days.

(21) Appl. No.: 09/641,433

(22) Filed: Aug. 17, 2000

(51) Int. Cl.⁷ ............................... B01J 19/08
(52) U.S. Cl. ................ 422/186.04; 204/164; 96/44
(58) Field of Search ............... 422/186.04; 204/164; 96/44

(56) References Cited

U.S. PATENT DOCUMENTS

| | | |
|---|---|---|
| 2,523,618 A | 9/1950 | Gilman |
| 2,841,242 A | 7/1958 | Hall |
| 3,443,362 A | 5/1969 | Ebert |
| 3,503,704 A | 3/1970 | Marks |
| 3,686,825 A | 8/1972 | Busby |
| 4,435,190 A | 3/1984 | Taillet et al. |
| 4,906,898 A | 3/1990 | Moisan |
| 5,254,155 A | 10/1993 | Mensi |
| 5,843,210 A | 12/1998 | Paranjpe et al. |
| 6,027,616 A | 2/2000 | Babko-Malyi |
| 6,117,403 A | 9/2000 | Alix et al. |

OTHER PUBLICATIONS

Ohkubo et al, "Time Dependence of $NO_x$ Removal Rate by a Corona Radical Shower System," *IEEE Transactions on Industry Applications*, vol. 32, No. 5, Sep./Oct., 1996, 1058–1062.

Urashima et al, "Reduction of $NO_x$ from Natural Gas Combustion Flue Gases by Corona Discharge Radical Injection Techiques," *IEEE Transactions on Industry Applications*, vol. 34, No. 5, Sep./Oct., 1998, 934–939.

*Primary Examiner*—Kishor Mayekar
(74) *Attorney, Agent, or Firm*—Arthur Jacob

(57) ABSTRACT

Certain contaminants are removed from a stream of contaminant-laden commercial and industrial exhaust gases conducted through an electrostatic precipitator by passing a reagent fluid through corona discharge active zones to activate the reagent fluid as the reagent fluid is injected into the stream such that the activated reagent fluid reacts with the contaminant to be removed. A combination discharge electrode and injector carries a plurality of electrode elements which establish the corona discharge active zones and include injector passages juxtaposed with the corona discharge active zones. The reagent fluid is injected into the stream by delivering the reagent fluid through the injector passages such that the reagent fluid passes through the corona discharge active zones and is activated as the reagent fluid is injected into the stream.

30 Claims, 3 Drawing Sheets

DISTRIBUTION OF CORONA DISCHARGE ACTIVATED REAGENT FLUID INJECTED INTO ELECTROSTATIC PRECIPITATORS

BACKGROUND OF THE INVENTION

Field of the Invention

The present invention relates generally to the reduction of contaminants emitted into the atmosphere as a result of commercial and industrial processes and pertains, more specifically, to apparatus and method for the removal of contaminants from commercial and industrial exhausts.

The continuing pursuit of more stringent regulations pertaining to the control of contaminants emitted into the ambient atmosphere has led to the requirement for more effective treatment of emissions emanating from commercial and industrial processes. In particular, the removal of toxic substances from commercial and industrial exhausts has received increased attention. Electrostatic precipitators have found widespread use in the treatment of contaminated exhaust gases. Efforts to increase the effectiveness of electrostatic precipitators have included the use of various arrangements in which liquids or gases are introduced into the exhaust gases as the exhaust gases are passed through electrostatic fields established in these electrostatic precipitators for further reducing the concentration of contaminants in the exhaust gases. It has been suggested that exhaust gases can be treated to remove even very low concentrations of certain contaminants by generating ions of selected reagent gases and injecting these ions into the contaminated industrial exhaust gases to produce reactions with the particular contaminants to be removed. The reagent gas is selected to produce ions which, in turn, will react with particular contaminants to assist in removal of these contaminants from the exhaust gases. More recently, nozzle gas injectors utilizing a corona discharge have been proposed for generating radicals to be injected into combustion gases being treated for removal of nitrogen oxides from the combustion gases.

BRIEF SUMMARY OF THE INVENTION

The present invention provides an improvement which accomplishes a more simplified and practical generation, injection and distribution of ions and other chemically active species produced by selected reagent fluids into currently available electrostatic precipitator configurations for enhancing the ability of otherwise essentially conventional electrostatic precipitators so as to enable the removal of contaminants heretofore difficult, if not impossible, to remove from commercial and industrial exhausts. As such, the present invention attains several objects and advantages, some of which are summarized as follows: Combines the ability of an electrostatic precipitator to remove particulates with the added ability to remove further noxious substances in a single apparatus; enables effective and efficient removal of a wider range of unwanted substances from commercial and industrial exhaust gases through the use of reactions heretofore unavailable in a single electrostatic precipitator; provides an effective method for introducing and distributing reactive ions and other chemically active species into a stream of contaminant-laden gas for the removal of a wider variety of contaminants in a single apparatus; enables the removal of contaminants heretofore difficult, if not impossible, to remove in conventional electrostatic precipitators; effects the conversion of removed contaminants into environmentally benign forms and produces minimal to no undesirable byproducts; facilitates the handling and disposition of a wider range of contaminants removed from industrial exhaust gases; allows the use of currently available electrostatic precipitator designs, configurations and technology with minimal modification to adapt to the added ability to remove noxious substances heretofore not capable of effective removal in a single apparatus; reduces installation space requirements and cost; exhibits exemplary performance over an extended service life.

The above objects and advantages, as well as further objects and advantages, are attained by the present invention which may be described briefly as an improvement in an electrostatic precipitator for removing contaminants from a stream of contaminant-laden gas conducted through a conduit in the electrostatic precipitator, the electrostatic precipitator including a longitudinally-extending discharge electrode placed within the conduit, and a collector electrode spaced laterally from the discharge electrode for establishing an electrostatic field between the discharge electrode and the collector electrode in response to a prescribed electrical potential between the discharge electrode and the collector electrode, the improvement comprising: a manifold passage extending longitudinally within the discharge electrode; a plurality of electrode elements located along the discharge electrode and projecting laterally from the discharge electrode into the conduit and toward the collector electrode, each electrode element terminating in at least one sharp-edged tip located within the conduit and spaced laterally from the collector electrode for establishing a corona discharge active zone juxtaposed with the tip in response to the prescribed electrical potential; an injector passage extending laterally through the discharge electrode at each electrode element, each injector passage communicating with the manifold passage and juxtaposed with the tip of a corresponding electrode element; and a source of reagent fluid communicating with the manifold passage for distributing reagent fluid through each injector passage toward each tip such that reagent fluid will pass through the corona discharge active zone juxtaposed with each tip for activating the reagent fluid as the reagent fluid is injected into the stream of contaminant-laden gas.

In addition, the present invention includes an improvement in a method for removing contaminants from a stream of contaminant-laden gas conducted through a conduit in an electrostatic precipitator, the electrostatic precipitator including a longitudinally-extending discharge electrode placed within the conduit, a collector electrode spaced laterally from the discharge electrode for establishing an electrostatic field between the discharge electrode and the collector electrode in response to a prescribed electrical potential between the discharge electrode and the collector electrode, the improvement comprising: providing a manifold passage within the discharge electrode; providing a plurality of electrode elements located along the discharge electrode and projecting into the conduit and toward the collector electrode, each electrode element terminating in at least one sharp-edged tip located within the conduit and spaced laterally from the collector electrode; establishing a corona discharge active zone juxtaposed with each tip in response to the prescribed electrical potential; providing an injector passage extending through the discharge electrode at each electrode element, each injector passage communicating with the manifold passage and juxtaposed with the tip of a corresponding electrode element; and distributing a reagent fluid through each injector passage toward each discharge tip such that reagent fluid will pass through the corona discharge active zone juxtaposed with each discharge tip to activate the reagent fluid as the reagent fluid is injected into the stream of contaminant-laden gas.

BRIEF DESCRIPTION OF THE SEVERAL VIEWS OF THE DRAWING

The invention will be understood more fully, while still further objects and advantages will become apparent, in the following detailed description of preferred embodiments of the invention illustrated in the accompanying drawing, in which.

DETAILED DESCRIPTION OF THE INVENTION

Figure 1:
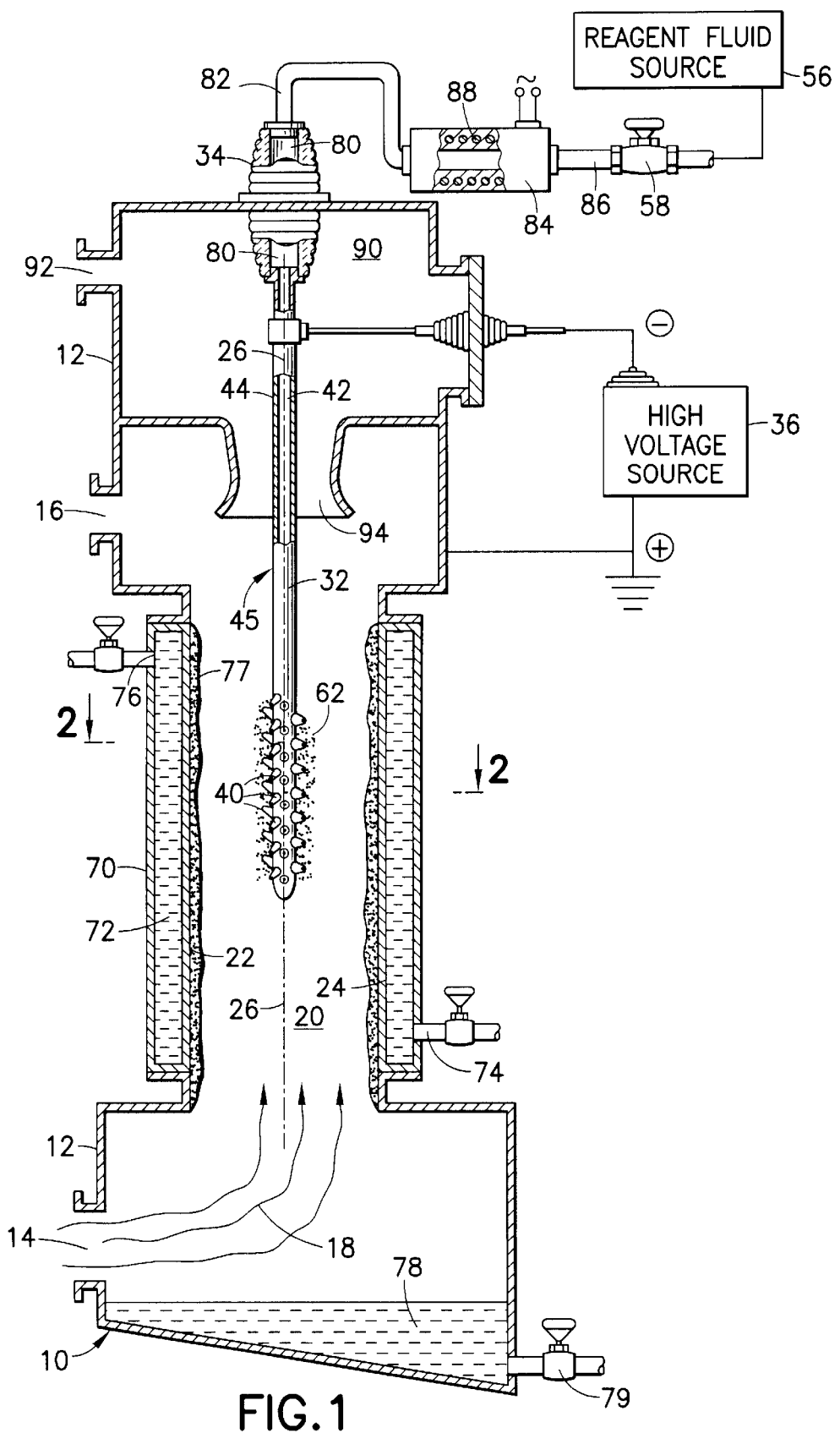
FIG. 1 is a partially diagrammatic, longitudinal cross-sectional view of an apparatus constructed and operated in accordance with the present invention.
Figure 2:
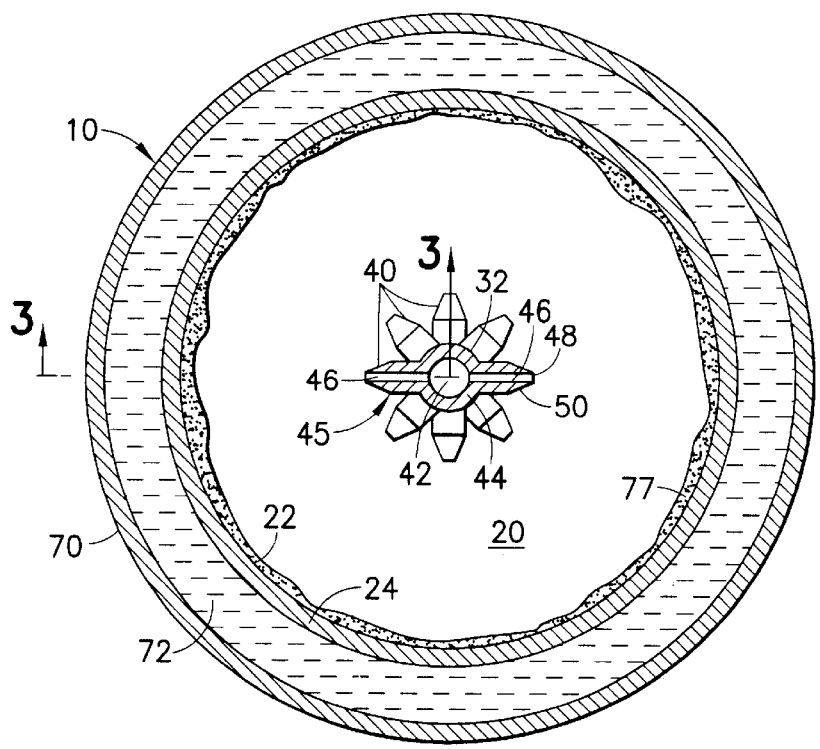
FIG. 2 is an enlarged lateral cross-sectional view taken along line 2—2 of FIG. 1.

Referring now to the drawing, and especially to FIGS. 1 and 2 thereof, an apparatus constructed in accordance with the present invention is illustrated largely diagrammatically in the form of an electrostatic precipitator 10 having a vertically oriented, longitudinally extending housing 12 which includes a lower inlet 14 and an upper outlet 16. Industrial or commercial exhaust in the form of a stream 18 of contaminant-laden gas enters the housing 12 at the inlet 14 and passes through a conduit 20 established by a collector electrode 22 having a generally cylindrical lateral cross-sectional configuration established by an essentially circular cylindrical wall 24 having a central longitudinal axis 26. A discharge electrode 32 extends along the longitudinal axis 26, surrounded by the wall 24 of the collector electrode 22. The discharge electrode 32 is mounted in the housing 12 by means of an insulator 34 which electrically isolates the discharge electrode 32 from the housing 12, and a source 36 of high voltage is connected between the discharge electrode 32 and the collector electrode 22 for establishing an electrostatic field between the collector electrode 22 and the discharge electrode 32 in response to a prescribed electrical potential provided by the source 36, in a manner similar to that which is now well-known in the construction of electrostatic precipitators.

A plurality of electrode elements are shown in the form of needle-like projections 40 extending laterally from the discharge electrode 32 at spaced apart locations along the discharge electrode 32, the projections 40 preferably projecting toward the collector electrode 22, essentially normal to the longitudinal axis 26, and being spaced apart from one another both longitudinally along the discharge electrode 32, as seen in FIG. 1, and circumferentially around the discharge electrode 32, as illustrated in FIG. 2. In the improvement of the present invention, the discharge electrode 32 is provided with a main manifold passage 42 which extends longitudinally along the discharge electrode 32, preferably centrally within the wall 44 of the discharge electrode 32 so that the discharge electrode 32 is a part of an electrode-injector unit 45. Subsidiary injector passages 46 extend laterally through the wall 44 of the discharge electrode 32 to communicate with the manifold passage 42. In the embodiment illustrated in FIGS. 1 and 2, the projections 40 are tubular and the injector passages 46 extend through the tubular projections 40 to an exit 48 located at the tip 50 of each corresponding projection 40 so that the electrode elements provided by projections 40 are in the form of electrode-injectors, and the combination of the discharge electrode 32 with the projections 40 establishes electrode-injector unit 45 which readily replaces a corresponding discharge electrode of a conventional electrostatic precipitator.

Figure 3:
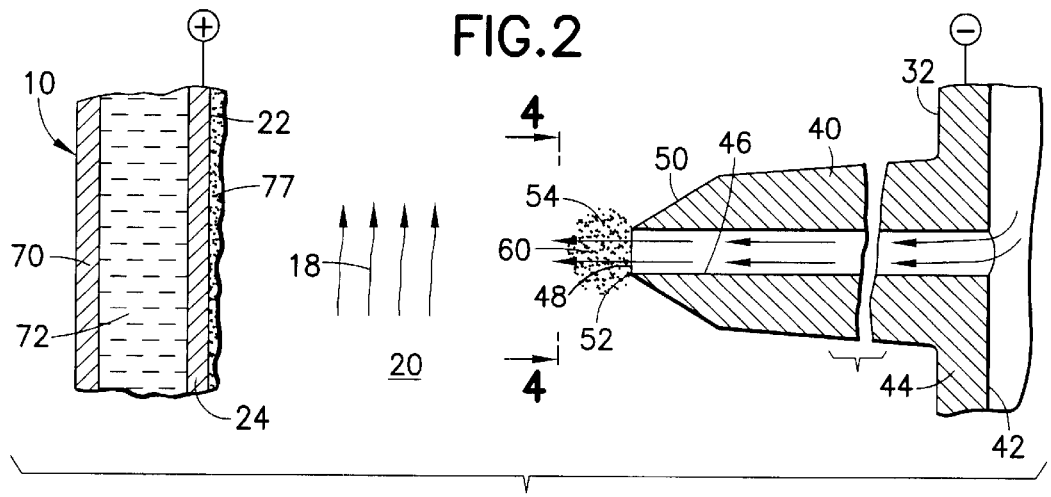
FIG. 3 is a cross-sectional view taken along line 3—3 of FIG. 2.
Figure 4:
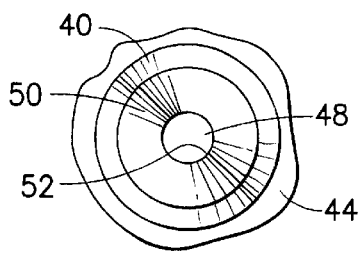
FIG. 4 is an end view taken as indicated by line 4—4 in FIG. 3.

As best seen in FIGS. 3 and 4, as well as in FIGS. 1 and 2, the tip 50 of each projection 40 terminates in a sharp edge 52 which extends circumferentially around the exit 48 of the corresponding injector passage 46. Thus, tip 50 provides each projection 40 with a generally circular, sharp-edged electrode tip located within the conduit 20 and spaced laterally from the collector electrode 22 for establishing an active zone 54 of a corona discharge juxtaposed with each tip 50 in response to the electrical potential supplied by source 36. A source 56 of reagent fluid communicates with manifold passage 42, through a control valve 58, for distributing a reagent fluid through each injector passage 46 to each tip 50 such that the reagent fluid will pass through the active zone 54 of the corona discharge juxtaposed with the tip 50, as illustrated at 60, as the reagent fluid is distributed and injected into the stream 18 of contaminant-laden gas, preferably in lateral directions toward the collector electrode 22. The reagent fluid will be activated by the corona discharge at the active zone 54 of the corona discharge to form chemically active reactants, such as ions, radicals and other chemically active species, which then enter into the stream 18. In the preferred arrangement, the number of projections 40, together with the longitudinal and circumferential spacing between adjacent projections 40, juxtaposes adjacent active zones 54 to establish a generally continuous envelope of active zones 54, as illustrated at 62 in FIG. 1.

The choice of a reagent fluid is dictated by the particular contaminant to be removed from the stream 18 of contaminant-laden gas. For example, where it is desired to remove mercury from the stream 18, the reagent fluid of choice includes water vapor and oxygen, preferably derived by mixing air or oxygen with steam in selected proportions. The mixture of water vapor and oxygen is essentially effective in the treatment of most of the typical exhaust gas contaminants; thus, in addition to mercury, the mixture is effective in reducing the concentration of $SO_x$, $NO_x$, unburned organics and other incompletely oxidized species. Chemical mechanisms involved in this example rely upon the formation of oxygen atoms, vibrationally excited molecules and other intermediates which promote the formation of hydroxyl and other radicals known to be effective oxidizing agents. The oxidation process is enhanced greatly in the presence of water droplets because most of the oxidation products and byproducts are stabilized in respective aqueous solutions.

Aqueous solutions of various compounds can be utilized in the fluid reagent mixture to induce additional desired effects. For example, aqueous urea or ammonia solutions can be used to enhance the removal of $NO_x$ from the stream 18, and to induce reactions leading to the formation of nitrogen, water and carbon dioxide as the final products, rather than the generation of nitric acid and nitrates as in the case of $NO_x$ (namely, NO and $NO_2$) oxidation by hydroxyl radicals.

In short, the reagent fluid can be delivered to the corona discharge active zone 54 in the form of a gas, an aerosol, a spray, fine powders entrained in a gaseous carrier, or any fluid form which will enable the reagent fluid to be activated in the corona discharge active zone 54 for subsequent injection into the stream 18 of contaminant-laden gas and reaction with a particular contaminant in the stream 18. The resultant reaction product carries a charge and is attracted to the collector electrode 22 for subsequent removal, in a manner known in the operation of electrostatic precipitators.

The electrostatic precipitator 10 of the illustrated embodiment is a condensing electrostatic precipitator and includes a coolant jacket 70 surrounding the collector electrode 22 for circulating a coolant 72, introduced at an inlet 74 and exiting at an outlet 76, to cool the wall 24. Thus, contaminants will be entrained in condensation, as illustrated at 77, for accumulation at 78 and simplified removal and disposal through a drain valve 79, as is known in connection with condensing electrostatic precipitators.

As described above, discharge electrode 32 is isolated electrically from housing 12 by insulator 34. As best seen in FIG. 1, insulator 34 includes an internal passage 80 which communicates with manifold passage 42 to enable the reagent fluid to pass from an inlet conduit 82 to the manifold passage 42 while the inlet conduit 82 is isolated electrically from the discharge electrode 32. In order to assure that the source 56 remains fully electrically isolated from the discharge electrode 32 during operation, a tubular ceramic coupler 84 couples a supply conduit 86 with the inlet conduit 82, and the coupler 84 is heated, during operation, as by an electric resistance heater coil 88, to prevent the formation of condensation within the coupler and thereby maintain the desired electrical isolation. Insulator 34 is placed within a chamber 90, and hot air is directed into the chamber 90 through a purge inlet 92 to pass through the chamber 90 to exit at a purge outlet 94 so as to prevent contaminants from accumulating along the insulator 34 and thereby compromising the desired electrical isolation the discharge electrode 32. The polarity of the high voltage applied between the collector electrode 22 and the discharge electrode 32 can be changed, and the amplitude and frequency of the applied high voltage can be varied in accordance with the reactions sought through the use of particular selected reagent fluids and the particular contaminants to be removed.

Figure 5:
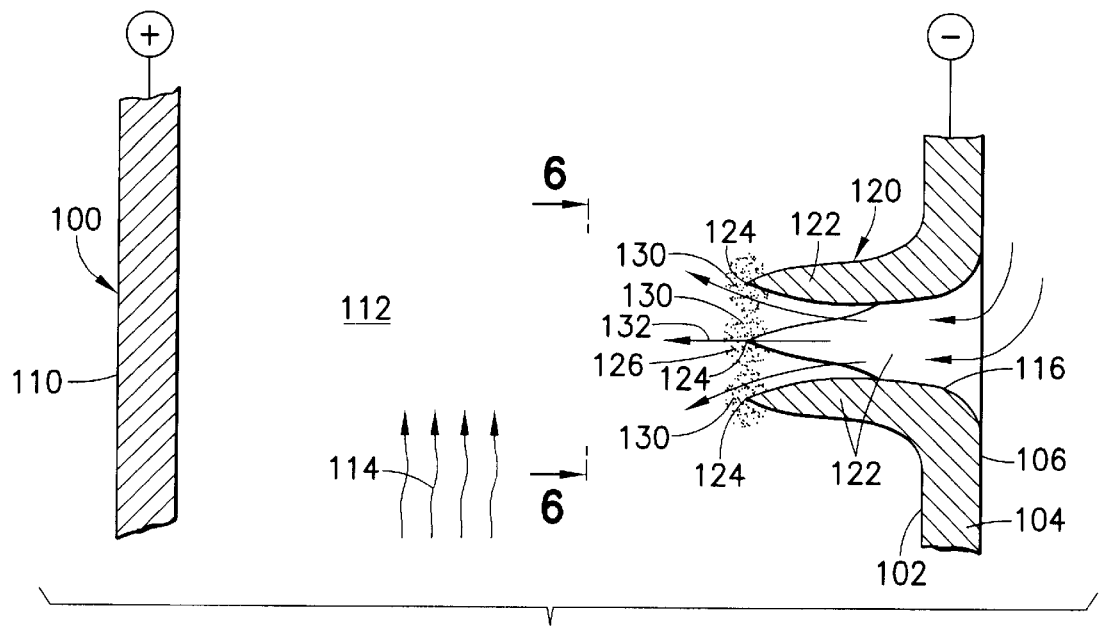
FIG. 5 is a fragmentary cross-sectional view similar to FIG. 3, and illustrating another embodiment of the invention.
Figure 6:
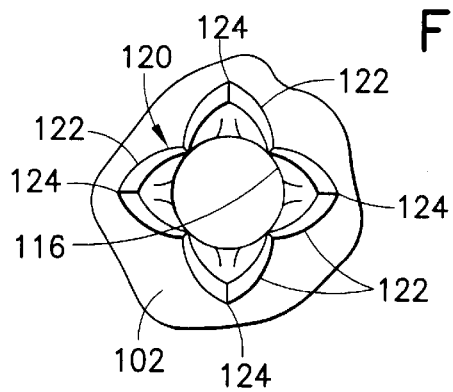
FIG. 6 is an end view taken as indicated by line 6—6 in FIG. 5.

Turning now to the alternate embodiment illustrated in FIGS. 5 and 6, as in the electrostatic precipitator 10, an electrostatic precipitator 100 has a discharge electrode 102 including a wall 104 and a manifold passage 106 communicating with a source of a reagent fluid, and a collector electrode 110 surrounds the discharge electrode 102 and establishes a conduit 112 for a stream 114 of contaminant-laden gas. However, in the present embodiment, electrode elements are formed by drilling or otherwise piercing the wall 104, in the direction laterally outwardly from the manifold passage 106 through the wall 104 toward the conduit 112, to establish each injector passage 116, while the material of the wall 104 which is forced radially outwardly by each piercing operation forms an electrode element 120 comprised of spikes 122 projecting laterally and terminating in a plurality of sharp-edged tips 124 spaced circumferentially around the perimeter of the injector passage 116, adjacent exit 126 of the injector passage 116. Corona discharge active zones 130 are established at the tips 124, juxtaposed with the exit 126 of a corresponding injector passage 116, such that the reagent fluid is passed through each corona discharge active zone 130 as the reagent fluid is conducted to the stream 114, as illustrated at 132. The multiple sharp-edged tips 124 arranged circumferentially about the exit 126 of each injector passage 116 establish effective corona discharge active zones 130 for enhanced performance in activating the reagent fluid conducted through the injector passages 116 for injection into the stream 114 of contaminant-laden gas.

Figure 7:
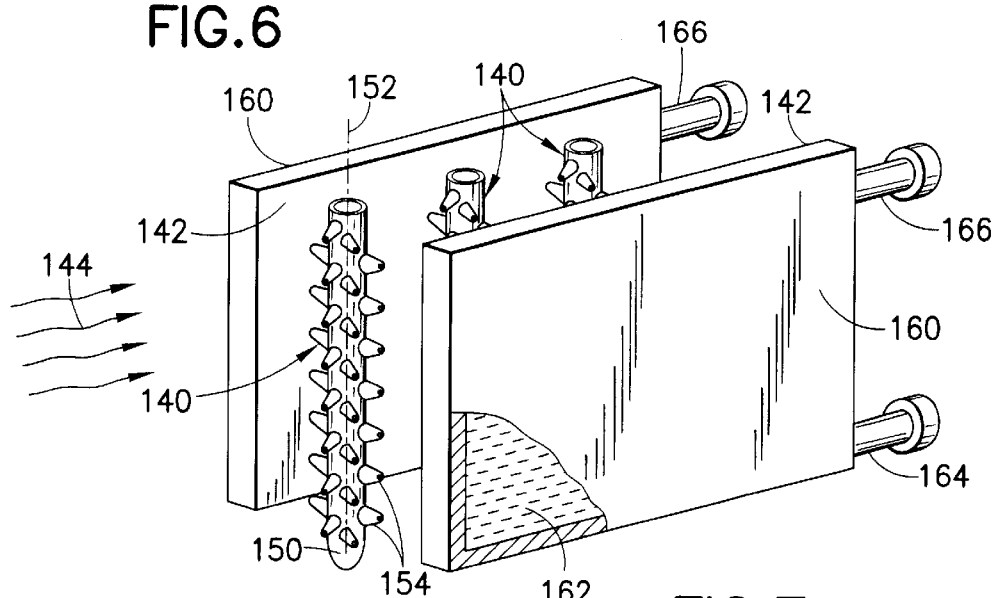
FIG. 7 is a partially diagrammatic pictorial perspective view of another apparatus constructed and operated in accordance with the present invention.

In the embodiment of the invention illustrated in FIG. 7, a plurality of electrode-injector units 140 are placed between parallel plate collector electrodes 142 having an essentially flat configuration, within a stream 144 of contaminant-laden gas passing between the collector electrodes 142 in the direction of the arrows. Each electrode-injector unit 140 is constructed similar to the electrode-injector unit 45 described above in that a discharge electrode 150 extends longitudinally, along a longitudinal axis 152 spaced laterally from the collector electrodes 142, and carries a plurality of electrode elements 154 spaced along the discharge electrode 150 and projecting from the discharge electrode 150, essentially normal to the longitudinal axis 152. As described in connection with the embodiments of FIGS. 1 through 6, a reagent fluid is distributed through the discharge electrodes 150 and the electrode elements 154 for injection into the stream 144 of contaminant-laden gas. As before, a coolant jacket 160 associated with each collector electrode 142 enables the circulation of a coolant 162 introduced at an inlet 164 and exiting at an outlet 166 for the selective cooling of each collector electrode 142.

It will be seen that the present invention attains the several objects and advantages summarized above, namely: Combines the ability of an electrostatic precipitator to remove particulates with the added ability to remove further noxious substances in a single apparatus; enables effective and efficient removal of a wider range of unwanted substances from commercial and industrial exhaust gases through the use of reactions heretofore unavailable in a single electrostatic precipitator; provides an effective method for introducing and distributing reactive ions and other chemically active species into a stream of contaminant-laden gas for the removal of a wider variety of contaminants in a single apparatus; enables the removal of contaminants heretofore difficult, if not impossible, to remove in conventional electrostatic precipitators; effects the conversion of removed contaminants into environmentally benign forms and produces minimal to no undesirable byproducts; facilitates the handling and disposition of a wider range of contaminants removed from industrial exhaust gases; allows the use of currently available electrostatic precipitator designs, configurations and technology with minimal modification to adapt to the added ability to remove noxious substances heretofore not capable of effective removal in a single apparatus; reduces installation space requirements and cost; exhibits exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. An improvement in an electrostatic precipitator for removing contaminants from a stream of contaminant-laden gas conducted through a conduit in the electrostatic precipitator, the electrostatic precipitator including a longitudinally-extending discharge electrode placed within the conduit, and a collector electrode spaced laterally from the discharge electrode for establishing an electrostatic field between the discharge electrode and the collector electrode in response to a prescribed electrical potential between the discharge electrode and the collector electrode, the improvement comprising:

a manifold passage extending longitudinally within the discharge electrode;

a plurality of electrode elements located along the discharge electrode and projecting laterally from the discharge electrode into the conduit and toward the collector electrode, each electrode element terminating in at least one sharp-edged tip located within the conduit and spaced laterally from the collector electrode for establishing a corona discharge active zone juxtaposed with the tip in response to the prescribed electrical potential;

an injector passage extending laterally through the discharge electrode at each electrode element, each injector passage communicating with the manifold passage and juxtaposed with the tip of a corresponding electrode element; and a source of reagent fluid communicating with the manifold passage for distributing reagent fluid through each injector passage toward each tip such that reagent fluid passes through the corona discharge active zone juxtaposed with each tip for activating the reagent fluid as the reagent fluid is injected into the stream of contaminant-laden gas.

2. The improvement of claim 1 wherein:

the collector electrode includes an essentially cylindrical configuration having a central longitudinal axis;

the discharge electrode extends along the longitudinal axis; and the electrode elements extend essentially normal to the longitudinal axis.

3. The improvement of claim 2 wherein at least some of the electrode elements are spaced longitudinally from one another along the discharge electrode.

4. The improvement of claim 3 wherein at least some of the electrode elements are spaced circumferentially from one another around the discharge electrode.

5. The improvement of claim 4 wherein the spacing between adjacent electrode elements is such that corresponding adjacent corona discharge active zones are juxtaposed to establish a generally continuous envelope of corona discharge active zones.

6. The improvement of claim 1 wherein:

the collector electrode includes an essentially flat configuration;

the discharge electrode extends along a longitudinal axis spaced laterally from the collector electrode; and the electrode elements extend essentially normal to the longitudinal axis.

7. The improvement of claim 6 wherein at least some of the electrode elements are spaced longitudinally from one another along the discharge electrode.

8. The improvement of claim 7 wherein at least some of the electrode elements are spaced circumferentially from one another around the discharge electrode.

9. The improvement of claim 8 wherein the spacing between adjacent electrode elements is such that corresponding adjacent corona discharge active zones are juxtaposed to establish a generally continuous envelope of corona discharge active zones.

10. The improvement of claim 1 wherein at least some injector passages extend through corresponding electrode elements.

11. The improvement of claim 10 wherein:

the collector electrode includes an essentially cylindrical configuration having a central longitudinal axis;

the discharge electrode extends along the longitudinal axis; and the electrode elements extend essentially normal to the longitudinal axis.

12. The improvement of claim 11 wherein at least some of the electrode elements are spaced longitudinally from one another along the discharge electrode.

13. The improvement of claim 12 wherein at least some of the electrode elements are spaced circumferentially from one another around the discharge electrode.

14. The improvement of claim 13 wherein the spacing between adjacent electrode elements is such that corresponding adjacent corona discharge active zones are juxtaposed to establish a generally continuous envelope of corona discharge active zones.

15. The improvement of claim 10 wherein at least some of the electrode elements include a plurality of sharp-edged tips spaced circumferentially from one another around a corresponding injector passage.

16. The improvement of claim 15 wherein:

the collector electrode includes an essentially cylindrical configuration having a central longitudinal axis;

the discharge electrode extends along the longitudinal axis; and the electrode elements extend essentially normal to the longitudinal axis.

17. The improvement of claim 16 wherein at least some of the electrode elements are spaced longitudinally from one another along the discharge electrode.

18. The improvement of claim 17 wherein at least some of the coronal discharge elements are spaced circumferentially from one another around the discharge electrode.

19. The improvement of claim 18 wherein the spacing between adjacent electrode elements is such that corresponding adjacent corona discharge active zones are juxtaposed to establish a generally continuous envelope of corona discharge active zones.

20. The improvement of claim 10 wherein:

the collector electrode includes an essentially flat configuration;

the discharge electrode extends along a longitudinal axis spaced laterally from the collector electrode; and the electrode elements extend essentially normal to the longitudinal axis.

21. The improvement of claim 20 wherein at least some of the electrode elements are spaced longitudinally from one another along the discharge electrode.

22. The improvement of claim 21 wherein at least some of the electrode elements are space circumferentially from one another around the discharge electrode.

23. The improvement of claim 22 wherein the spacing between adjacent electrode elements is such that corresponding adjacent corona discharge active zones are juxtaposed to establish a generally continuous envelope of corona discharge active zones.

24. An improvement in a method for removing contaminants from a stream of contaminant-laden gas conducted through a conduit in an electrostatic precipitator, the electrostatic precipitator including a longitudinally-extending discharge electrode placed within the conduit, a collector electrode spaced laterally from the discharge electrode for establishing an electrostatic field between the discharge electrode and the collector electrode in response to a prescribed electrical potential between the discharge electrode and the collector electrode, the improvement comprising:

providing a manifold passage within the discharge electrode;

providing a plurality of electrode elements located along the discharge electrode and projecting into the conduit and toward the collector electrode, each electrode element terminating in at least one sharp-edged tip located within the conduit and spaced laterally from the collector electrode;

establishing a corona discharge active zone juxtaposed with each tip in response to the prescribed electrical potential;

providing an injector passage extending through the discharge electrode at each electrode element, each injector passage communicating with the manifold passage and juxtaposed with the tip of a corresponding electrode element; and distributing a reagent fluid through each injector passage toward each discharge tip such that reagent fluid passes through the corona discharge active zone juxtaposed with each discharge tip to activate the reagent fluid as the reagent fluid is injected into the stream of contaminant-laden gas.

25. The improvement of claim 24 wherein at least some of the electrode elements are spaced longitudinally from one another along the discharge electrode such that the reagent fluid is injected at locations spaced longitudinally from one another.

26. The improvement of claim 25 wherein at least some of the electrode elements are spaced circumferentially from one another around the discharge electrode such that the reagent fluid is injected at locations spaced circumferentially from one another.

27. The improvement of claim 26 wherein the spacing between adjacent electrode elements is such that corresponding adjacent corona discharge active zones are juxtaposed to establish a generally continuous envelope of corona discharge active zones and the reagent fluid is injected through the generally continuous envelope.

28. The improvement of claim 24 wherein at least some injector passages extend through corresponding electrode elements such that the reagent fluid is passed through the corresponding electrode elements to corresponding corona discharge active zones.

29. The improvement of claim 24 wherein the reagent fluid includes water vapor.

30. The improvement of claim 24 wherein the reagent fluid includes water vapor and oxygen.

* * * * *